United States Patent
Yoshinaka et al.

(10) Patent No.: US 8,198,362 B2
(45) Date of Patent: Jun. 12, 2012

(54) DAMPING MATERIAL AND METHOD FOR PRODUCTION THEREOF

(75) Inventors: Satoshi Yoshinaka, Kanagawa (JP);
Takeo Hayashi, Kanagawa (JP);
Kazuaki Mukasa, Kanagawa (JP);
Takuya Minezaki, Kanagawa (JP);
Takao Ota, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 1111 days.

(21) Appl. No.: 12/065,107

(22) PCT Filed: Aug. 28, 2006

(86) PCT No.: PCT/JP2006/316891
§ 371 (c)(1),
(2), (4) Date: Feb. 28, 2008

(87) PCT Pub. No.: WO2007/026653
PCT Pub. Date: Mar. 8, 2007

(65) Prior Publication Data
US 2009/0278293 A1    Nov. 12, 2009

(30) Foreign Application Priority Data
Aug. 29, 2005   (JP) .................................. 2005-247399

(51) Int. Cl.
*C08L 67/00* (2006.01)
*C08K 9/04* (2006.01)
(52) U.S. Cl. ......... 524/601; 524/449; 524/605; 524/847
(58) Field of Classification Search .................. 524/601, 524/449, 605, 847
See application file for complete search history.

(56) References Cited

U.S. PATENT DOCUMENTS

| | | | |
|---|---|---|---|
| 5,183,863 A | 2/1993 | Nakamura et al. | |
| 2003/0004256 A1* | 1/2003 | Ogasawara et al. | 524/495 |
| 2005/0215703 A1* | 9/2005 | Mukasa et al. | 524/601 |
| 2006/0100330 A1* | 5/2006 | Natarajan et al. | 524/315 |

FOREIGN PATENT DOCUMENTS

| | | |
|---|---|---|
| EP | 1 571 176 | 9/2005 |
| JP | 03-188165 | 8/1991 |
| JP | 05-222239 | 8/1993 |
| JP | 08-073648 | 3/1996 |
| JP | 10-067901 | 3/1998 |
| JP | 10-231385 | 9/1998 |
| JP | 2003-171820 | 6/2003 |
| JP | 2003-201373 | 7/2003 |
| JP | 2003-221496 | 8/2003 |
| JP | 2003-241766 | 8/2003 |
| JP | 2004-143324 | 5/2004 |
| JP | 2004-189817 | 7/2004 |
| WO | WO 02/053647 A1 | 7/2002 |

OTHER PUBLICATIONS

Chinese Official Action issued Jul. 30, 2010, for CN Application No. 200680030372.2. (Translation only).

* cited by examiner

*Primary Examiner* — James J Seidleck
*Assistant Examiner* — Deve E Valdez
(74) *Attorney, Agent, or Firm* — Antonelli, Terry, Stout & Kraus, LLP.

(57) ABSTRACT

Provided is a vibration damping material comprising: a polyester resin containing dicarboxylic acid constitutional units and diol constitutional units; and mica being dispersed in the polyester resin, wherein: (1) a ratio $[(A_1+B_1)/(A_0+B_0)]$ of a total of $(A_1)$ a number of the dicarboxylic acid constitutional units having an odd number of carbon atoms in a polyester main chain and $(B_1)$ a number of the diol constitutional units having an odd number of carbon atoms in the polyester main chain with respect to a total of $(A_0)$ a number of total dicarboxylic acid constitutional units and $(B_0)$ a number of total diol constitutional units in the polyester resin is in the range of 0.5 to 1; and (2) an average particle diameter calculated from a volume-based particle diameter frequency distribution of the mica in the vibration damping material is 25 to 500 μm. The damping material has a high versatility, is lightweight, shows an excellent vibration damping property and can be produced easily with a batch mixer.

30 Claims, No Drawings

DAMPING MATERIAL AND METHOD FOR PRODUCTION THEREOF

TECHNICAL FIELD

The present invention relates to a vibration damping material and a method of producing the same. More specifically, the present invention relates to a vibration damping material, which is mainly formed of a polymeric material, has high versatility, is lightweight, exhibits a more excellent vibration-damping ability, and can be simply produced, and a method of producing the same.

BACKGROUND ART

Hitherto, there has been known as a material to absorb vibration energy, such as a vibration damping material, soft vinyl chloride resins formed of a vinyl chloride resin added with a plasticizer. The soft vinyl chloride-based resins are designed so as to attenuate the vibration energy by consuming the vibration energy in the resins as frictional heat. However, the absorption and attenuation of the vibration energy is still insufficient.

Besides, rubber materials such as butyl rubber and acrylonitrile-butadiene rubber have been widely used as the vibration damping materials, which are excellent in terms of processability, mechanical strength, and costs. However, though those rubber materials are most excellent in attenuation performance (transfer-insulating or transfer-reducing performance of vibration energy) among the general polymeric materials, the vibration damping ability (absorbability of vibration energy) thereof is too low for its sole use as the vibration damping material. Therefore, to apply the rubber materials, for example, to vibration proof structures for buildings or apparatuses, the rubber materials have been used in composite forms such as a laminate of the rubber material and a steel plate and a vibration damping structure of the laminate combined with a lead core that absorbs vibration energy by plastic deformation or an oil damper.

Thus, the conventional rubber materials cannot be solely used as the vibration damping materials as described above, and should be made into composite forms, inevitably making the vibration proof structures complicated. As a result, it has been demanded to enhance the vibration damping ability of the vibration damping materials themselves and the rubber materials themselves.

There are disclosed compositions formed mainly of a polymeric material and a piezoelectric powdery material (JP 03-188165 A, and Inaba, et al., "Relationship between Mechanical Properties and Damping Performance of Piezoelectric Damping composites," Journal of The Society of Rubber Industry, Japan, vol. 67, p. 564 (1994)). Those compositions are intended to absorb and attenuate vibrations by converting vibration energy into electric energy by the action of electro-mechanical conversion of the piezoelectric material and dispersing the electric energy. However, to achieve a sufficient effect, the compositions must contain the piezoelectric particles in an amount as large as 50% by mass or more. The blending in such a high content lowers the fluidity in a molten state and makes the kneading and molding difficult. In addition, since the piezoelectric particles are made of ceramics such as lead zirconate titanate and barium titanate, the composition is increased in its mass, which being a drawback.

There has been disclosed a vibration damping material including a polymer matrix that contains an active ingredient for increasing dipole moment (Inoue, et al., Damping Behaviors of Chlorinated Polyethylene/N,N'-dicyclohexyl-2-Benzothiazole Sulfenamide Organic Hybrid: Journal of The Society of Fiber Science and Technology, Japan, vol. 56, p. 443 (2000)). However, since the active ingredient used in the material is a low-molecular compound, the material has such a drawback that the active ingredient exudes from the polymer matrix to deteriorate the performances.

There have been known vibration damping materials including a polymeric material such as a polyester resin or the like, and an electroconductive material. For example, JP 2003-221496 A discloses a vibration damping material in which a polyester resin is used as the polymeric material and the electroconductive material is dispersed, but has no description about the use of a specific polyester resin. JP 2003-221496 A describes a composite vibration damping material made of a viscoelastic resin including a copolyester, a crosslinking agent, etc. Accordingly, the production of the composite requires a step of crosslinking reaction by heating. Thus, the production method disclosed in JP 2003-221496 A cannot be said necessarily simple and easy. Further, the glass transition temperature of the copolyester, which can be used herein, is limited to fall within a range of from −60° C. to 0° C., so the material does not necessarily fully satisfy the requirements as the material being excellent in versatility.

Further, JP2003-241766 A relates to a sound damping structure using nonwoven fabric for a polyester resin or the like, JP2003-171820 A relates to a sound damping fiber using a piezoelectric polymer for the polyester resin or the like, and JP 5-222239 A relates to a vibration damping steel sheet using a viscoelastic resin for the vibration damping materials for the polyester resin or the like. However, the specific descriptions of the components constituting the polyester resins are not made in those documents.

Further, there is disclosed a resin composition formed of a polymeric material and a filler. However, there is not disclosed a vibration damping material prepared by incorporating fillers into a polyester resin in which the ratio of carbon atoms in a polyester main chain is specified. JP 10-67901 A relates to a thermoplastic polymer composition using styrene resins. JP 10-231385 A relates to a composition for a vibration damping material containing polyvinyl chloride, chlorinated polyethylene, and epoxidized polyisoprene. However, those compositions are not necessarily high in vibration damping ability despite that a sample piece has a relatively large thickness of 2 mm or 3 mm, showing that a well satisfactory vibration damping material is not achieved by merely incorporating filer into the polymer matrix. Besides, WO 2002/053647 relates to a vibration damping material using a polymeric material having viscosity characteristics, in which there are exemplified polymers having the viscosity characteristics. However, there is no specific description about the starting material for constituting the polymer.

JP2003-201373 A discloses a vibration damping material in which mica is incorporated as a filler in a polymeric material. However, there is no description about a vibration damping material prepared by incorporating mica into a polyester resin or a vibration damping material specifying an average particle diameter of mica in the vibration damping material.

DISCLOSURE OF THE INVENTION

It is an object of the present invention is to provide a vibration damping material mainly formed of a polymeric material, which has high versatility, is lightweight, exhibits a more excellent vibration-damping ability, and can be simply produced.

The inventors of the present invention carried out extensive research to achieve the above-mentioned object, and, as a result, acquired the following findings. A vibration damping material in which mica is incorporated as a filler into a polyester resin is lightweight and can be simply produced. Generally speaking, in the production thereof, mica is incorporated into a polymeric material by kneading the mica in a molten polymeric material. However, since the mica breaks during the kneading process, the average particle diameter of the mica which has been actually incorporated in the vibration damping material becomes smaller than that of a starting mica. Thus, the inventors found that the vibration damping ability is remarkably improved by using a specific polyester resin and specifying the average particle diameter of the mica which has actually incorporated in the vibration damping material, thereby obtaining a vibration damping material with high versatility. The present invention has been accomplished based on this finding.

More specifically, the present invention provides the following vibration damping materials and a method of producing the same.

1. A vibration damping material including: a polyester resin containing dicarboxylic acid constitutional units and diol constitutional units; and mica being dispersed in the polyester resin, in which: (1) a ratio $[(A_1+B_1)/(A_0+B_0)]$ of a total of $(A_1)$ a number of the dicarboxylic acid constitutional units having an odd number of carbon atoms in a polyester main chain and $(B_1)$ a number of the diol constitutional units having an odd number of carbon atoms in the polyester main chain with respect to a total of $(A_0)$ a number of total dicarboxylic acid constitutional units and $(B_0)$ a number of total diol constitutional units in the polyester resin is in the range of 0.5 to 1; and (2) an average particle diameter calculated from a volume-based particle diameter frequency distribution of the mica in the vibration damping material is 25 to 500 μm.

2. The vibration damping material according to the above item 1, in which: a ratio $(A_1/A_0)$ of $(A_1)$ the number of the dicarboxylic acid constitutional units having an odd number of carbon atoms in the polyester main chain with respect to $(A_0)$ the number of total dicarboxylic acid constitutional units is in the range of 0.5 to 1; and a ratio $(B_2/B_0)$ of $(B_2)$ a number of constitutional units derived from diol represented by the general formula (1) with respect to $(B_0)$ the number of total diol constitutional units is in the range of 0.5 to 1.

[Chemical Formula 1]

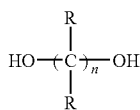

(1)

where R represents a hydrogen atom or a $C_{1-3}$ alkyl group and R's may be the same or different, and n is 3 or 5.

3. The vibration damping material according to the above item 1, in which the polyester resin has: (A) an intrinsic viscosity when measured at 25° C. in a 40/60 by mass trichloroethane/phenol mixed solvent is 0.2 to 2.0 dL/g; and (B) a heat value of crystallization exotherm peak under temperature drop conditions measured using a differential scanning calorimeter is 5 J/g or less.

4. The vibration damping material according to the above item 2, in which a ratio $(B_2/B_0)$ of $(B_2)$ the number of constitutional units derived from the diol represented by the general formula (1) with respect to $(B_0)$ the number of total diol constitutional units of the polyester resin is in the range of 0.7 to 1.

5. The vibration damping material according to the above item 2, in which a ratio $(A_2/A_0)$ of $(A_2)$ a number of constitutional units derived from dicarboxylic acid selected from the group consisting of isophthalic acid, malonic acid, glutaric acid, pimelic acid, azelaic acid, undecanedioic acid, brassylic acid, and 1,3-cyclohexanedicarboxylic acid with respect to $(A_0)$ the number of total dicarboxylic acid constitutional units in the polyester resin is in the range of 0.5 to 1.

6. The vibration damping material according to the above item 5, in which the ratio $(A_2/A_0)$ is in the range of 0.7 to 1.

7. The vibration damping material according to the above item 5, in which a ratio $(A_3/A_0)$ of $(A_3)$ the number of constitutional units derived from the isophthalic acid with respect to $(A_0)$ the number of total dicarboxylic acid constitutional units of the polyester resin is in the range of 0.5 to 1.

8. The vibration damping material according to the above item 2, in which a ratio $(B_3/B_0)$ of $(B_3)$ a number of constitutional units derived from diol selected from the group consisting of 1,3-propanediol, 1,5-pentanediol, 2-methyl-1,3-propanediol, 1,3-butanediol, and neopentyl glycol with respect to $(B_0)$ the number of total diol constitutional units in the polyester resin is in the range of 0.5 to 1.

9. The vibration damping material according to the above item 8, in which the ratio $(B_3/B_0)$ is in the range of 0.7 to 1.

10. The damping material according to the above item 1, in which the diol constitutional units having an odd number of carbon atoms in the main chain are units derived from at least one diol selected from the group consisting of 1,3-propanediol, 1,5-pentanediol, 2-methyl-1,3-propanediol, 1,3-butanediol and neopentyl glycol.

11. The vibration damping material according to the above item 1, in which the dicarboxylic acid constitutional unit having an odd number of carbon atoms in the main chain is a constitutional unit derived from a combination of isophthalic acid and azelaic acid.

12. The vibration damping material according to the above item 11, in which the dicarboxylic acid constitutional unit having an odd number of carbon atoms in the main chain is a constitutional unit derived from isophthalic acid.

13. The vibration damping material according to the above item 1, in which a median particle diameter measured from a volume-based particle diameter frequency distribution of the mica in the vibration damping material is 25 to 500 μm.

14. The vibration damping material according to the above item 13, in which an average particle diameter measured from a volume-based particle diameter frequency distribution of the mica in the vibration damping material is 60 to 300 μm.

15. The vibration damping material according to the above item 14, in which a median particle diameter measured from a volume-based particle diameter frequency distribution of the mica in the vibration damping material is 60 to 300 μm.

16. The vibration damping material according to the above item 1, further including an electroconductive material.

17. The vibration damping material according to the above item 16, in which the electroconductive material is a carbonaceous material.

18. The vibration damping material according to the above item 16, in which the electroconductive material is an electroconductive carbon powder.

19. The vibration damping material according to the above item 16, in which a content of the electroconductive material is 0.01 to 25% by mass.

20. The vibration damping material according to the above item 16, in which the composition has a volume resistivity of $1.0 \times 10^{+12}$ Ω·cm or lower.

21. The vibration damping material according to the above item 1, in which a content of the mica is 10 to 80% by mass.

22. A vibration damper including a molded vibration damping material according to any one of the above items 1 to 21.

23. A method of producing the vibration damping material according to any one of the above items 1 to 21, including mixing mica with a batch mixer.

24. The method of producing a vibration damping material according to the above item 23, including adding a wax when mixing mica.

25. The method of producing a vibration damping material according to the above item 24, in which the wax includes a montanic acid ester wax.

26. The method of producing a vibration damping material according to the above item 24, including: adding and mixing a wax after mixing the electroconductive material and the polyester resin; and adding and mixing mica.

BEST MODE FOR CARRYING OUT THE INVENTION

Hereinafter, the present invention will be described in detail.

A vibration damping material of the present invention includes: a polyester resin containing dicarboxylic acid constitutional units and diol constitutional units; and mica being dispersed in the polyester resin, in which: (1) a ratio $[(A_1+B_1)/(A_0+B_0)]$ of a total of $(A_1)$ a number of the dicarboxylic acid constitutional units having an odd number of carbon atoms in a polyester main chain and $(B_1)$ a number of the diol constitutional units having an odd number of carbon atoms in the polyester main chain with respect to a total of $(A_0)$ a number of total dicarboxylic acid constitutional units and $(B_0)$ a number of total diol constitutional units in the polyester resin is in the range of 0.5 to 1; and (2) an average particle diameter calculated from a volume-based particle diameter frequency distribution of the mica in the vibration damping material is 25 to 500 μm.

Thus, by specifying (1) the ratio $[(A_1+B_1)/(A_0+B_0)]$ of the number of dicarboxylic acid constitutional units having an odd number of carbon atoms in a polyester main chain and the number of diol constitutional units having an odd number of carbon atoms in the polyester main chain and (2) the average particle diameter calculated from a volume-based particle diameter frequency distribution of mica in the vibration damping material, a vibration damping material with a high vibration ability can be obtained.

In this case, "the number of carbon atoms in the polyester main chain of the dicarboxylic acid constitutional units (or the diol constitutional units)" refers to the number of carbon atoms present in the shortest path along the polyester main chain in each monomer unit intervened between one ester linkage (—C(=O)—O—) and the next ester linkage.

In the present invention, the ratio $[(A_1+B_1)/(A_0+B_0)]$ of the total of $(A_1)$ the number of dicarboxylic acid constitutional units having an odd number of carbon atoms in a polyester main chain and $(B_1)$ the number of diol constitutional units having an odd number of carbon atoms in the polyester main chain with respect to the total of $(A_0)$ the number of total dicarboxylic acid constitutional units and $(B_0)$ the number of total diol constitutional units in the polyester resin is preferably in the range of 0.5 to 1, and more preferably 0.7 to 1. Moreover, the number of carbon atoms of the dicarboxylic acid constitutional units in the polyester main chain and the number of carbon atoms in the diol constitutional units in the main chain are preferably odd numbers of 1, 3, 5, 7, and 9.

Examples of the dicarboxylic acid constitutional units having an odd number of carbon atoms in the polyester resin main chain include constitutional units derived from isophthalic acid, malonic acid, glutaric acid, pimelic acid, azelaic acid, undecanedioic acid, brassylic acid, and 1,3-cyclohexanedicarboxylic acid. Of those, the constitutional units derived from isophthalic acid and 1,3-cyclohexanedicarboxylic acid is preferred and the constitutional unit derived from isophthalic acid is more preferred. The polyester resin may include one or more kinds of constitutional units derived from the above dicarboxylic acids. Further, if two or more kinds of constitutional units are included, preferred are those derived from isophthalic acid and azelaic acid.

Examples of the diol constitutional units having an odd number of carbon atoms in the polyester resin main chain include constitutional units derived from 1,3-propanediol, 1,3-butanediol, 2-methyl-1,3-propanediol, 1,3-pentanediol, 1-methyl-1,3-butanediol, 2-methyl-1,3-butanediol, neopentyl glycol, 1,3-hexanediol, 3-methyl-1,3-butanediol, 1,5-pentanediol, 2-methyl-1,5-pentanediol, 3-methyl-1,5-pentanediol, 1,5-hexanediol, 2-ethyl-1,5-pentanediol, 2-propyl-1,5-pentanediol, m-xylene glycol, 1,3-cyclohexanediol, and 1,3-bis(hydroxymethyl)cyclohexane. Of those, the constitutional units derived from 1,3-propanediol, 1,3-butanediol, 2-methyl-1,3-propanediol, neopentyl glycol, 1,5-pentanediol, m-xylene glycol and 1,3-cyclohexanediol is preferred and the constitutional units derived from 1,3-propanediol, 1,5-pentanediol, 2-methyl-1,3-propanediol, 1,3-butanediol, and neopentyl glycol is more preferred. The polyester resin may include one or more kinds of constitutional units derived from the above diols.

Further, in the vibration damping material of the present invention, a ratio $(A_1/A_0)$ of $(A_1)$ the number of the dicarboxylic acid constitutional units having an odd number of carbon atoms in the polyester main chain with respect to $(A_0)$ the number of total dicarboxylic acid constitutional units is preferably in the range of 0.5 to 1, and has a ratio $(B_2/B_0)$ of $(B_2)$ a number of constitutional units derived from diol represented by the general formula (1) with respect to $(B_0)$ the number of total diol constitutional units is preferably in the range of 0.5 to 1.

[Chemical Formula 1]

(1)

where R represents a hydrogen atom or a $C_{1-3}$ alkyl group and R's may be the same or different, and n is 3 or 5.

Examples of the diols represented by the general formula (1) include 1,3-propanediol, 1,3-butanediol, 2-methyl-1,3-propanediol, 1,3-pentanediol, 1-methyl-1,3-butanediol, 2-methyl-1,3-butanediol, neopentyl glycol, 1,3-hexanediol, 3-methyl-1,3-butanediol, 1,5-pentanediol, 2-methyl-1,5-pentanediol, 3-methyl-1,5-pentanediol, 1,5-hexanediol, 2-ethyl-1,5-pentanediol, and 2-propyl-1,5-pentanediol. Of those, 1,3-propanediol, 1,5-pentanediol, 2-methyl-1,3-propanediol, 1,3-butanediol and neopentyl glycol is preferred.

In the vibration damping material of the present invention, it is preferable that the polyester resin have (A) the intrinsic viscosity measured in a 40/60 by mass trichloroethane/phenol mixed solvent at 25° C. of 0.2 to 2.0 dL/g, and (B) the heat value of crystallization exotherm peak under temperature drop conditions measured using a differential scanning calorimeter of 5 J/g or less. A higher vibration damping ability can be achieved by satisfying the (A) and (B) above.

Further, in the vibration damping material of the present invention, a ratio $(B_2/B_0)$ of $(B_2)$ the number of constitutional units derived from the diol represented by the general formula (1) with respect to $(B_0)$ the number of total diol constitutional units of the polyester resin is preferably in the range of 0.7 to 1.

In the vibration damping material of the present invention, the ratio $(A_2/A_0)$ of $(A_2)$ the number of constitutional units derived from dicarboxylic acid selected from the group consisting of isophthalic acid, malonic acid, glutaric acid, pimelic acid, azelaic acid, undecanedioic acid, brassylic acid, and 1,3-cyclohexanedicarboxylic acid with respect to $(A_0)$ the number of total dicarboxylic acid constitutional units in a polyester resin is preferably in the range of 0.5 to 1, and more preferably 0.7 to 1.

Further, a ratio $(A_3/A_0)$ of $(A_3)$ the number of constitutional units derived from the isophthalic acid with respect to $(A_0)$ the number of total dicarboxylic acid constitutional units of the polyester resin is preferably in the range of 0.5 to 1.

The ratio $(B_3/B_0)$ of $(B_3)$ the number of constitutional units derived from diol selected from the group consisting of 1,3-propanediol, 1,5-pentanediol, 2-methyl-1,3-propanediol, 1,3-butanediol, and a neopentyl glycol with respect to the number of total diol constitutional units $(B_0)$ in the polyester resin is preferably in the range of 0.5 to 1, and more preferably 0.7 to 1.

Note that in addition to the dicarboxylic acid constitutional units and the diol constitutional units mentioned above, the polyester resin used in the present invention may further contain other constitutional units in amounts not adversely affecting the effects of the invention. The types of other constitutional units are not critical, and the polyester resin may contain constitutional units derived from any of polyester-forming dicarboxylic acids and their esters (referred to as "other dicarboxylic acids"), polyester-forming diols (referred to as "other diols") and polyester-forming hydroxycarboxylic acids and their esters (referred to as "other hydroxycarboxylic acids").

Examples of other dicarboxylic acids include dicarboxylic acids or dicarboxylates such as terephthalic acid, orthophthalic acid, 2-methylterephthalic acid, 2,6-naphthalenedicarboxylic acid, succinic acid, adipic acid, suberic acid, sebacic acid, dodecanedioic acid, 1,4-cyclohexanedicarboxylic acid, decalindicarboxylic acid, norbornanedicarboxylic acid, tricyclodecanedicarboxylic acid, pentacyclododecanedicarboxylic acid, isophoronedicarboxylic acid and 3,9-bis(2-carboxylethyl)-2,4,8,10-tetraoxaspiro[5.5]undecane; and tri- or more valent polycarboxylic acids such as trimellitic acid, trimesic acid, pyromellitic acid and tricarbarylic acid.

Examples of other diols include aliphatic diols such as ethylene glycol, 1,2-propylene glycol, 2-methyl-1,2-propanediol, 1,4-butanediol, 1,6-hexanediol, 2,5-hexanediol, diethylene glycol and triethylene glycol; polyether compounds such as polyethylene glycol, polypropylene glycol and polybutylene glycol; tri or more valents polyhydric alcohols such as glycerin, tirmethylol propane and pentaerythritol; alicyclic diols such as 1,3-cyclohexane dimethanol, 1,4-cyclohexane dimethanol, 1,2-decahydronaphthalene dimethanol, 1,3-decahydronaphthalene dimethanol, 1,4-decahydronaphthalene dimethanol, 1,5-decahydronaphthalene dimethanol, 1,6-decahydronaphthalene dimethanol, 2,7-decahydronaphthalene dimethanol, tetralin dimethanol, norbornane dimethanol, tricyclodecane dimethanol, 5-methylol-5-ethyl-2-(1,1-dimethyl-2-hydroxyethyl)-1,3-dioxane, pentacyclodecane dimethanol and 3,9-bis(1,1-dimethyl-2-hydroxyethyl)-2,4,8,10-tetraoxaspiro[5.5]undecane; alkyleneoxide adducts of bisphenols, such as 4,4'-(1-methylethylidene)bisphenol, methylenebisphenol (bisphenol F), 4,4'-cyclohexylidene bisphenol (bisphenol Z) and 4,4'-sulfonylbisphenol (bisphenol S); and alkyleneoxide adducts of aromatic dihydroxy compounds, such as hydroquinone, resorcin, 4,4'-dihydroxybiphenyl, 4,4'-dihydroxydiphenyl ether and 4,4'-dihydroxydiphenylbenzophenone.

Examples of other hydroxycarboxylic acids include hydroxybenzoic acid, dihydroxybenzoic acid, hydroxyisophthalic acid, hydroxyacetic acid, 2,4-dihydroxyacetophenone, 2-hydroxyhexadecanoic acid, 12-hydroxystearic acid, 4-hydroxyphthalic acid, 4,4'-bis(p-hydroxyphenyl)pentanoic acid, and 3,4-dihydroxycinnamic acid.

There is no limitation on the method of producing the polyester resin used in the present invention, and conventionally known methods can be employed. In general, the polyester resin is produced by polycondensation of starting monomers. For example, transesterification or direct esterification conducted by melt polymerization method and a solution polymerization method can be mentioned. In those methods, there may be used conventionally known transesterification catalysts, esterification catalysts, etherification inhibitors, polymerization catalysts, and stabilizers such as heat stabilizers, and light stabilizers, polymerization adjusters, which are used in polymerization. Mentioned as the transesterification catalysts are compounds containing metals such as manganese, cobalt, zinc, titanium, and calcium. Mentioned as the esterification catalysts are compounds containing metals such as manganese, cobalt, zinc, titanium, and calcium. Mentioned as etherification inhibitors are amine compounds and the like. Examples of the polycondensation catalysts include compounds containing metals such as germanium, antimony, tin, and titanium (e.g., germanium oxide (IV); antimony oxide (III), triphenyl stibine, antimony acetate (III); tin (II) oxide; titanates such as titanium (IV) tetrabutoxide, titanium (IV) tetraisopropoxide, titanium (IV) bis(acetylacetonato)diisopropoxide). It is also effective to add, as a heat stabilizer, various phosphorus compounds such as phosphoric acid, phosphorous acid, and phenylphosphonic acid. In addition, light stabilizers, antistatic agents, lubricants, antioxidants, mold release agents, etc., may be added. Examples of the starting dicarboxylic acid components include the dicarboxylic acid from which the dicarboxylic acid constitutional unit is derived and dicarboxylic derivative such as dicarboxylate, dicarboxylic chloride, active acyl derivative, and dinitrile.

In the vibration damping material of the present invention, to improve the absorption ability of vibration energy by the polyester resin, mica is dispersed in the polyester resin. There is no limitation on the kind of mica used in the present invention, and a scaly white mica with high vibration energy absorption effect is preferable.

In view of the ease of orientation of the dispersed mica inside the vibration damping material, mica whose average particle diameter is 25 to 500 µm is used in the vibration damping material of the present invention.

Here, the average particle diameter of the mica in the vibration damping material refers to a value obtained by ashing the vibration damping material to separate the mica; measuring the volume-based particle diameter frequency distribution of the mica with a laser diffraction/scattering type particle size distribution measuring device; and calculating the average particle diameter from the typical diameter and the particle diameter frequency in each particle diameter range. It should be noted that the volume-based particle diameter frequency distribution is obtained by measuring the volume occupied by particles which are present in the particle diameter range which is equally divided to small sections on the logarithm scale, with respect to the total volume of all particles. The average particle diameter is calculated from the typical diameter and the particle diameter frequency in the particle diameter range according to Equation (I). It should be noted that the typical particle size in the particle diameter range is defined by Equation (II):

[Equation 1]
$$\text{Average particle diameter} = \sum_{j=1}^{n} q(j) \times X(j) \div \sum_{j=1}^{n} q(j) \quad \text{(I)}$$

where q(j) represents a particle diameter frequency(%) in the j-th particle diameter range and X(j) represents a typical diameter in the j-th particle diameter range; and

[Equation 2]
$$\text{Log}_{10}X(j) = \frac{\text{Log}_{10}X(j_a) + \text{Log}_{10}X(j_b)}{2} \quad \text{(II)}$$

where $X(j_a)$ represents a lower limit of the particle diameter in the j-th particle diameter range and $X(j_b)$ represents an upper limit in the particle diameter of the j-th particle diameter range.

By adjusting the average particle diameter of the mica in the vibration damping material to 25 µm or more, the orientation inside the vibration damping material becomes favorable, and thus, the vibration damping ability is improved. By adjusting the average particle diameter to 500 µm or lower, the necessity of using a starting mica having a larger particle diameter for preventing the crushing of mica during kneading is eliminated. Since the mica having a larger particle diameter also has a large thickness, the aspect ratio of the crushed mica after kneading is lowered, and the vibration energy absorption effect is lowered, whereby the vibration damping ability is reduced. When a large mica is dispersed, the surface qualities of a vibration damper molded of a vibration damping material are deteriorated.

It is more preferable that the median particle diameter of the mica in the vibration damping material be 25 to 500 µm. Here, the median particle diameter of the mica in the vibration damping material refers to a particle diameter equivalent to 50% in cumulative terms of the volume-based particle diameter frequency distribution at the time when ashing the vibration damping material to separate the mica, and measuring the particle size distribution of the mica with a laser diffraction/scattering type particle size distribution measuring device. By adjusting the median particle diameter of the mica in the vibration damping material to 25 µm or more, the deterioration of the vibration damping ability owing to a great deal of small mica, which is hard to orient inside the vibration damping material may be prevented. By adjusting the median particle diameter in the vibration damping material to 500 µm or less, the necessity of using a starting mica having a much larger particle diameter for preventing the crushing of mica during kneading is eliminated. Since the mica having a larger particle diameter also has a large thickness, the aspect ratio of the crushed mica after kneading is lowered, and the vibration energy absorption effect is lowered, whereby the vibration damping ability is reduced. When a large mica is dispersed, the surface qualities of a vibration damper molded of a vibration damping material are deteriorated.

In order to achieve a much higher vibration damping ability, it is preferable that the average particle diameter of the mica in the vibration damping material be 60 to 300 µm, and it is more preferable that the median particle diameter of the mica in the vibration damping material be 60 to 300 µm.

In order to adjust the average particle diameter of the mica in the vibration damping material to 25 to 500 µm, it is necessary to use a starting mica whose average particle diameter is at least 25 µm or more. In view of the crushing of the mica during kneading, it is preferable to use a starting mica whose average particle diameter is 50 µm or more. If mica whose average particle diameter is too large is used as a starting mica, the average particle diameter of the mica in the vibration damping material does not fall under the range of 25 to 500 µm. Thus, such mica is not preferable. The average particle diameter of a starting mica is preferably 25 to 1,000 µm, more preferably 50 to 500 µm, and still more preferably 100 to 300 µm.

In order to adjust the median particle diameter of the mica in the vibration damping material to 25 to 500 µm, it is necessary to use a starting mica whose median particle diameter is at least 25 µm or more. In view of the crushing of the mica during kneading, it is preferable to use a starting mica whose median particle diameter is 50 µm or more. If mica whose median particle diameter is too large is used as a starting mica, the median particle diameter of the mica in the vibration damping material does not fall under the range of 25 to 500 µm. Thus, such mica is not preferable. The median particle diameter of a starting mica is preferably 25 to 500 µm, more preferably 50 to 500 µm and still more preferably 100 to 300 µm.

It is preferable that the addition amount of mica be preferably 10 to 80% by mass, and more preferably 30 to 70% by mass with respect to the vibration damping material. By incorporating mica in a proportion of 10% by mass or more, the vibration-damping ability is improved. By incorporating mica in a proportion of 80% by mass or lower, the content of mica is increased, thereby improving the vibration damping ability without losing the moldability.

When an electroconductive material, in addition to a polyester resin and mica, is dispersed in the vibration damping material of the present invention, the vibration damping ability can be further improved.

Known electroconductive materials are usable. Examples thereof include inorganic electroconductive materials containing: powders or fibers of metals such as silver, copper, copper alloys, nickel and low-melting point alloys; fine particles of copper and silver each being coated with a noble metal; fine particles or whiskers of metal oxides such as tin oxide, zinc oxide, and indium oxide; electroconductive carbon particles such as various carbon blacks and carbon nanotubes; and carbon fibers such as PAN-based carbon fibers, pitch-based carbon fibers and vapor-phase grown graphite, and organic conductive materials containing: low-molecular surfactant-type antistatic agents; polymer antistatic agents; electroconductive polymers such as polypyrrole and polyaniline; and metal-coated fine particles of polymers. These electroconductive materials may be used alone or in combination of two or more.

Of those electroconductive materials, preferably used is at least one carbonaceous material selected from the group consisting of electroconductive carbon powders such as carbon blacks and carbon nanotubes, and carbon fibers such as PAN-based carbon fibers, pitch-based carbon fibers and vapor-phase grown graphite.

By using an electroconductive carbon powder as the electroconductive material, a higher vibration damping ability is achieved. Thus, the electroconductive carbon powder is particularly preferable.

There is no limitation on the amount of the electroconductive material. When the amount of the electroconductive material is 0.01 to 25% by mass with respect to the vibration damping material, a higher vibration damping ability is achieved. By adjusting the amount of the electroconductive material to 0.01% by mass or more, the vibration damping ability is improved due to the electroconductive material. By adjusting the amount of the electroconductive material to 25% by mass or less, the content of the electroconductive material is increased, thereby improving the vibration damping ability without losing the moldability. The amount of the electroconductive material is preferably 1 to 20% by mass, and more preferably 5 to 20% by mass, with respect to the vibration damping material.

Further, the mixing ratio between the polyester resin and the electroconductive material is preferably controlled so as to allow the resin composition to have a volume resistivity of $1.0 \times 10^{+12} \Omega \cdot cm$ or lower, because a still higher vibration damping ability is achieved. In the present invention, the volume resistivity is measured by the method of JIS K6911.

The vibration damping material used for the present invention can contain, besides mica, inorganic scaly fillers or inorganic fillers having shapes other than the scaly shape insofar as the effects of the invention are not adversely affected. For example, as the inorganic scaly fillers, glass flakes, sericite, graphite, talc, aluminum flakes, boron nitride, molybdenum disulfide, etc., are mentioned. Examples of the fillers having shapes other than the scaly shape include, but not limited to, glass fibers, carbon fibers, calcium carbonate, calcium sulfate, calcium silicate, titanium dioxide, zinc oxide, silicon dioxide, strontium titanate, barite, precipitated barium sulfate, magnesium silicate, aluminium silicate, ferrite, clay, vermiculite, montmorillonite, stainless steel flakes, nickel flakes, silica, borax, kiln ashes, cement, dolomite, iron powder, lead powder, and copper powder.

The vibration damping material of the present invention is formed mainly of the polyester resin and mica. However, the resin composition may further contain, if necessary, at least one additive. Examples of such additives include dispersants, compatibilizers, surfactants, antistatic agents, lubricants, plasticizers, flame retardants, crosslinking agents, antioxidants, anti-aging agents, weather-resisting agents, heat-resisting agents, processing aids, brighteners, colorants such as pigments and dyes, foaming agents and foaming aids. Other resins may be blended into the resin composition and the molded articles of the resin composition may be surface-treated unless the effects of the present invention are adversely affected.

The vibration damping material of the present invention can be obtained by mixing mica, and, as required, an electroconductive material and other additives in the polyester resin. Known methods can be used insofar the average particle diameter of the mica in the vibration damping material is adjusted to 25 to 500 μm. For example, a melt mixing method using a mixing apparatus such as a heat roll, kneader, Banbury mixer, intermixer, twin-screw kneader, or extruder is mentioned. In an alternative method, the polyester resin is dissolved into or swelled in a solvent and then dried after mixed with mica or materials each are mixed in fine powder form. Among the melt mixing methods, a method using a batch mixer is preferable. In particular, the kneading time can be adjusted at will when using any one of mixing apparatuses such as a kneader, Banbury mixer, and intermixer. Therefore, the dispersion state of mica becomes favorable, and, in addition, the kneading process is terminated when the average particle diameter of the mica in the vibration damping material falls under the range of 25 to 500 μm and the material can be discharged. Thus, those mixing apparatuses are preferable. The kneading time cannot be generally determined because it varies depending on the size of the mixing apparatus, the incorporation proportion of each material, and the dimension of a clearance between a mixing tank and a blade. However, an excessively long kneading time reduces the average particle diameter of the mica in the vibration damping material, and thus is not preferable. When mixing each material while heating any one of the mixing tank, blade, and lid in those mixing apparatuses, the melt viscosity of the polyester resin decreases and the shearing force which advances the crushing of mica is lowered. Therefore, mica can be dispersed without excessively crushing mica. As the heating method, known methods, such as steam, heat medium, and heater, can be used. A heating temperature varies depending on the composition of the polyester resin. It is preferable to heat a resin to reach a temperature, at which the resin is melt, or higher. However, the resin is not heated to reach a temperature at which the thermal decomposition of the resin remarkably advances.

When mixing with the batch mixer, it is preferable to add a wax because the addition of a wax facilitates the discharge of the material. Since the melt viscosity of resin falls when a wax is added, the shearing force is lowered and mica can be dispersed without excessively crushing mica. Examples of the wax include, but not limited to: polyolefin waxes such as polyethylene wax, oxidized polyethylene wax, fluorine-modified polyethylene wax, polypropylene wax, oxidized polypropylene wax, and vinyl acetate-ethylene copolymer wax; organo silicone wax, higher fatty acid ester wax; carnauba wax; and montanic acid ester wax. Of those, montanic acid ester wax is preferable. The addition amount of the wax is preferably 0.1 to 10% by mass, and more preferably, 0.1 to 3% by mass with respect to the vibration damping material. It should be noted that the method and order of mixing the mica, electroconductive material, wax, and additives are not limited, and a batch collectively-kneading method can be used. However, a separately-kneading method is preferable, which involves kneading the polyester resin and the electroconductive material, and then adding and kneading the wax, and further adding and kneading the mica. This is because the average particle diameter of the mica in the vibration damping material falls under the range of 25 to 500 μm and the dispersibility of each material becomes favorable.

EXAMPLES

The present invention will be described in more detail with reference to examples, but the present invention is not limited thereto.

The polyester resin and the vibration damping material were evaluated by the following methods.

(1) Molar Ratio of Constitutional Units of Polyester Resin: [$(A_1+B_1)/(A_0+B_0)$], $(A_1/A_0)$, $(B_2/B_0)$, $(A_2/A_0)$, $(A_3/A_0)$, $(B_3/B_0)$:

Calculated from a ratio of integrated value of 400 MHz-$^1$H-NMR spectra.

(2) Intrinsic Viscosity of Polyester Resin [η]

An intrinsic viscosity of polyester resin [η] was measured by dissolving a polyester resin in a 40:60 (mass ratio) by weight trichloroethane/phenol mixed solvent at 25° C. using a Cannon-Fenske viscometer.

(3) Calorie of Crystallization Exotherm Peak under Temperature Drop Conditions of Polyester Resin (ΔHc)

The calorie of crystallization exotherm peak under temperature decrease conditions (ΔHc) of the polyester resin was measured by a differential scanning calorimeter "DSC/TA-50WS" available from Shimadzu Corporation. About 10 mg of sample was placed in an aluminum container without sealing. Then, in a nitrogen gas flow (30 mL/min), the sample was heated to 280° C. at a temperature rise rate of 20° C./min, held at 280° C. for one minute, and then cooled at a temperature drop rate of 10° C./min. The calorie was calculated from the area of the exotherm peak appeared during the temperature dropping.

(4) Average Particle Diameter and Median Particle Diameter of Starting Mica and Mica in Vibration Damping Material:

About 2 g of a vibration damping material was weighed in a magnetic crucible, and was subjected to preliminary ashing on an electric heater. The resultant was further heated at 600° C. for 4 hours in a muffle furnace for ashing, thereby separating mica. The volume-based particle diameter frequency distribution of the separated mica was measured with a laser diffraction/scattering type particle size distribution measuring device (LA-910, manufactured by HORIBA, Ltd.). Water was used as a dispersion medium. It should be noted that the volume-based particle diameter frequency distribution is obtained by measuring the volume occupied by particles which are present in the particle diameter range which is equally divided into small sections on the logarithm scale, with respect to the total volume of all particles. As the average particle diameter, the average value of the particle diameter was calculated from the typical particle size and the particle diameter frequency in the particle diameter range according to Equation (I). The typical particle size in the particle diameter range is defined according to Equation (II). As the median particle diameter, a particle diameter equivalent to 50% in cumulative terms was calculated. As the particle size distribution of a starting mica, the starting mica was measured as it was with the same apparatus.

[Equation 3]

$$\text{Average particle diameter} = \sum_{j=1}^{n} q(j) \times X(j) \div \sum_{j=1}^{n} q(j) \quad (I)$$

where $q(j)$ is the particle diameter frequency(%) in the j-th particle diameter range and $X(j)$ is a typical particle size in the j-th particle diameter range.

[Equation 4]

$$\text{Log}_{10} X(j) = \frac{\text{Log}_{10} X(j_a) + \text{Log}_{10} X(j_b)}{2} \quad (II)$$

where $X(j_a)$ represents a lower limit of the particle diameter in the j-th particle diameter range and $X(j_b)$ represents an upper limit of the particle diameter in the j-th particle diameter range.

(5) Volume Resistivity of Vibration Damping Material:

A vibration damping material was formed at 100° C. by heat pressing, thereby obtaining a sheet of about 1 mm in thickness. The obtained sheet was measured for the volume resistivity according to JIS K6911.

(6) Loss Factor of Vibration Damping Material

A vibration damping material was hot-pressed into a sheet of about 1 mm thick. From the sheet, a 10 mm×150 mm test piece was cut out, which was heat-press bonded to a 1 mm-thick substrate (aluminum alloy 5052) or bonded to the substrate by a two-part curable epoxy-based adhesive (tradename: CEMEDINE SG-EPO EP008, manufactured by Cemedine Co., Ltd.) to prepare a non-constrained vibration damper. Using a loss factor tester (available from Ono Sokki Co., Ltd.), the obtained non-constrained vibration damper was tested for the loss factor at 500 Hz anti-resonance point in a measuring temperature of 0 to 80° C. by center excitation method. The vibration damping ability was evaluated by comparing the maximum loss factors in the measuring temperature range. The larger the loss factor, the higher the vibration damping ability is.

Example 1

A 30-L polyester production apparatus equipped with a packed fractionating column, a stirring fin, a partial condenser, a total condenser, a cold trap, a thermometer, a heater, and a nitrogen gas inlet was charged with: 54.75 mol of isophthalic acid (manufactured by AG. International Chemical Co., Inc.); 20.25 mol of azelaic acid (trade name: EMEROX1144, manufactured by Cognis Co., Ltd., EMEROX1144 containing 93.3 mol % of azelaic acid and 99.97% of dicarboxylic acid in total.); 150 mol of 1,3-propanediol (manufactured by Shell Chemicals Japan Co., Ltd.); and 3.5 g of manganese acetate tetrahydrates (manufactured by Wako Pure Chemical Industries, Ltd.) (33 ppm in terms of manganese based on total charge), and the contents were heated to 220° C. under ordinary pressure in a nitrogen atmosphere to cause esterification to proceed for 3.5 hours. After the reactive conversion of isophthalic acid has reached 90 mol % or higher, 12.2 g of a titanium (IV) tetrabutoxide monomer (manufactured by Wako Pure Chemical Industries, Ltd.) (79 ppm in terms of titania based on total mass of initial condensation product) was added. After gradually raising the temperature and reducing the pressure, the polycondensation was allowed to proceed at 250 to 260° C. under 0.3 kPa or lower while discharging 1,3-propanediol out of the reaction system. The viscosity of the reaction mixture gradually increased. The reaction was terminated when the melt viscosity reached an appropriate level, thereby obtaining a polyester resin (A). The constitutional unit ratios, the intrinsic viscosity [η] and the calorie of crystallization exotherm peak (ΔHc) of the obtained polyester resin (A) are shown below.

$(A_1+B_1)/(A_0+B_0)=1.0$
$(A_1/A_0)=1.0$
$(A_2/A_0)=1.0$
$(A_3/A_0)=0.73$
$(B_2/B_0)=1.0$
$(B_3/B_0)=1.0$
$[\eta]=0.68$ (dL/g)
$\Delta Hc=0$ (J/g).

36 parts by mass of the obtained polyester resin (A) and 4 parts by mass of electroconductive carbon powder (trade name: Ketjenblack EC, manufactured by Ketjenblack International Co., Ltd.) and 60 parts by mass of scaly mica (trade name: B-82, manufactured by Yamaguchi Mica Co., Ltd., average particle diameter of starting mica: 114 μm, median particle diameter of starting mica: 94 μm) were collectively put in a 60-cm³ kneader, and kneaded at 130° C. for 15 minutes, thereby obtaining a vibration damping material. The volume resistivity of the obtained vibration damping material was $3.8 \times 10^{+6}$ Ω·cm. The average particle diameter, median particle diameter, and loss factor of the mica in the vibration damping material are shown in Table 1.

Example 2

36 parts by mass of the polyester resin (A), 4 parts by mass of electroconductive carbon powder (Ketjenblack EC), and 60 parts by mass of scaly mica (B-82) were collectively put in a 60-cm³ kneader, and kneaded at 150° C. for 15 minutes, thereby obtaining a vibration damping material. The volume resistivity of the obtained vibration damping material was $1.1 \times 10^{+6}$ Ω·cm. The average particle diameter, median particle diameter, and loss factor of the mica in the vibration damping material are shown in Table 1.

Example 3

36 parts by mass of the polyester resin (A), 4 parts by mass of electroconductive carbon powder (Ketjenblack EC), and 60 parts by mass of scaly mica (trade name: B-82) were collectively put in a 60-cm³ kneader, and kneaded at 200° C. for 15 minutes, thereby obtaining a vibration damping material. The volume resistivity of the obtained vibration damping material was $4.1 \times 10^{+6}$ Ω·cm. The average particle diameter, median particle diameter, and loss factor of the mica in the vibration damping material are shown in Table 1.

Example 4

36 parts by mass of the polyester resin (A) and 4 parts by mass of electroconductive carbon powder (Ketjenblack EC) were put in a 3-L kneader, and kneaded at 200° C. for 15 minutes. Thereafter, 60 parts by mass of scaly mica (B-82) was additionally put therein, and further kneaded at 200° C. for 15 minutes, thereby obtaining a vibration damping material. The volume resistivity of the obtained vibration damping material was $7.0 \times 10^{+6}$ Ω·cm. The average particle diameter, median particle diameter, and loss factor of the mica in the vibration damping material are shown in Table 1.

Example 5

The procedure of Example 1 was followed except using: 75 mol of isophthalic acid as a starting material of dicarboxylic acid constitutional units; and 150 mol of 2-methyl-1,3-propanediol (manufactured by Dairen Chemical Corporation) as a starting material of diol constitutional units, thereby obtaining a polyester resin (B). The constitutional unit ratios, the intrinsic viscosity [η] and the calorie of crystallization exotherm peak (ΔHc) of the obtained polyester resin (B) are shown below.

$(A_1+B_1)/(A_0+B_0)=1.0$
$(A_1/A_0)=1.0$
$(A_2/A_0)=1.0$
$(A_3/A_0)=1.0$
$(B_2/B_0)=1.0$
$(B_3/B_0)=1.0$
$[\eta]=0.68$ (dL/g)
$\Delta Hc=0$ (J/g).

36 parts by mass of the polyester resin (B) and 4 parts by mass of electroconductive carbon powder (Ketjenblack EC) were put in a 3-L kneader, and kneaded at 200° C. for 10 minutes. Thereafter, 6 parts by mass of polyethylene wax (trade name; Licowax PE520, manufactured by Clariant Japan Co., Ltd.) was additionally put therein, and kneaded at 200° C. for 1 minute. Furthermore, 60 parts by mass of scaly mica (B-82) was additionally put therein, and further kneaded at 200° C. for 15 minutes, thereby obtaining a vibration damping material. The volume resistivity of the obtained vibration damping material was $5.5 \times 10^{+6}$ Ω·cm. The average particle diameter, median particle diameter, and loss factor of the mica in the vibration damping material are shown in Table 1.

Example 6

The procedure of Example 1 was followed except using: 50.25 mol of isophthalic acid (manufactured by AG. International Chemical Co., Inc.) as a starting material of dicarboxylic acid constitutional units; 24.75 mol of azelaic acid (trade name: EMEROX1144, manufactured by Cognis Co., Ltd.; and 150 mol of 2-methyl-1,3-propanediol (manufactured by Dairen Chemical Corporation) as a starting material of diol constitutional units, thereby obtaining a polyester resin (C). The constitutional unit ratios, the intrinsic viscosity [η] and the calorie of crystallization exotherm peak (ΔHc) of the obtained polyester resin (C) are shown below.

$(A_1+B_1)/(A_0+B_0)=1.0$
$(A_1/A_0)=1.0$
$(A_2/A_0)=1.0$
$(A_3/A_0)=0.67$
$(B_2/B_0)=1.0$
$(B_3/B_0)=1.0$
$[\eta]=0.61$ (dL/g)
$\Delta Hc=0$ (J/g).

36 parts by mass of the obtained polyester resin (C), 4 parts by mass of electroconductive carbon powder (Ketjenblack EC), and 60 parts by mass of scaly mica (B-82), were collectively put in a 60-cm³ kneader, and kneaded at 200° C. for 15 minutes, thereby obtaining a vibration damping material. The volume resistivity of the obtained vibration damping material was $3.1 \times 10^{+5}$ Ω·cm. The average particle diameter, median particle diameter, and loss factor of the mica in the vibration damping material are shown in Table 1.

Example 7

36 parts by mass of the polyester resin (C) and 4 parts by mass of electroconductive carbon powder (Ketjenblack EC) were put in a 3-L kneader, and kneaded at 200° C. for 10 minutes. Thereafter, 60 parts by mass of scaly mica (B-82) was additionally put therein, and further kneaded at 200° C. for 15 minutes, thereby obtaining a vibration damping material. The volume resistivity of the obtained vibration damping material was $2.1 \times 10^{+6}$ Ω·cm. The average particle diameter, median particle diameter, and loss factor of the mica in the vibration damping material are shown in Table 1.

Example 8

36 parts by mass of the polyester resin (C), 4 parts by mass of electroconductive carbon powder (Ketjenblack EC), 60 parts by mass of scaly mica (B-82), and 1 part by mass of montanic acid ester wax (trade name; Licowax E, manufactured by Clariant Japan Co., Ltd.) were collectively put in a 60-cm³ kneader, and kneaded at 120° C. for 15 minutes, thereby obtaining a vibration damping material. The volume resistivity of the obtained vibration damping material was $1.7 \times 10^{+7}$ Ω·cm. The average particle diameter, median particle diameter, and loss factor of the mica in the vibration damping material are shown in Table 1.

Example 9

36 parts by mass of the polyester resin (C), 4 parts by mass of electroconductive carbon powder (Ketjenblack EC), 60 parts by mass of scaly mica (B-82), and 1 part by mass of montanic acid ester wax (Licowax E) were collectively put in a 60-cm³ kneader, and kneaded at 150° C. for 15 minutes, thereby obtaining a vibration damping material. The volume resistivity of the obtained vibration damping material was $6.7 \times 10^{+6}$ Ω·cm. The average particle diameter, median particle diameter, and loss factor of the mica in the vibration damping material are shown in Table 1.

Example 10

36 parts by mass of the polyester resin (C), 4 parts by mass of electroconductive carbon powder (Ketjenblack EC), 60 parts by mass of scaly mica (B-82), and 1 part by mass of montanic acid ester wax (Licowax E) were collectively put in a 60-cm³ kneader, and kneaded at 200° C. for 15 minutes, thereby obtaining a vibration damping material. The volume resistivity of the obtained vibration damping material was $3.7 \times 10^{+6} \Omega \cdot cm$. The average particle diameter, median particle diameter, and loss factor of the mica in the vibration damping material are shown in Table 1.

Example 11

36 parts by mass of the polyester resin (C) and 4 parts by mass of electroconductive carbon powder (Ketjenblack EC) were put in a 3-L kneader, and kneaded at 160° C. for 5 minutes. Thereafter, 1 part by mass of montanic acid ester wax (Licowax E) was additionally put therein, and further kneaded at 160° C. for 5 minutes. Then, 60 parts by mass of scaly mica (B-82) was additionally put therein, and kneaded at 160° C. for 13 minutes, thereby obtaining a vibration damping material. The volume resistivity of the obtained vibration damping material was $1.2 \times 10^{+7} \Omega \cdot cm$. The average particle diameter, median particle diameter, and loss factor of the mica in the vibration damping material are shown in Table 1.

Example 12

36 parts by mass of the polyester resin (C) and 4 parts by mass of electroconductive carbon powder (Ketjenblack EC) were put in a 75-L kneader, and kneaded at 160° C. for 4 minutes. Thereafter, 1 part by mass of montanic acid ester wax (Licowax E) was additionally put therein, and further kneaded at 160° C. for 1 minute. Then, 60 parts by mass of scaly mica (B-82) was additionally put therein, and kneaded at 160° C. for 13 minutes, thereby obtaining a vibration damping material. The volume resistivity of the obtained vibration damping material was $3.1 \times 10^{+7} \Omega \cdot cm$. The average particle diameter, median particle diameter, and loss factor of the mica in the vibration damping material are shown in Table 2.

Example 13

36 parts by mass of the polyester resin (C) and 4 parts by mass of electroconductive carbon powder (Ketjenblack EC) were put in a 3-L kneader, and kneaded at 200° C. for 5 minutes. Thereafter, 1 part by mass of montanic acid ester wax (Licowax E) was additionally put therein, and further kneaded at 200° C. for 5 minutes. Then, 60 parts by mass of scaly mica (trade name: CS-060DC, manufactured by Yamaguchi Mica Co., Ltd., average particle diameter of starting mica: 206 μm, median particle diameter of starting mica: 176 μm) was additionally put therein, and kneaded at 200° C. for 13 minutes, thereby obtaining a vibration damping material. The volume resistivity of the obtained vibration damping material was $1.8 \times 10^{+7} \Omega \cdot cm$. The average particle diameter, median particle diameter, and loss factor of the mica in the vibration damping material are shown in Table 2.

Example 14

36 parts by mass of the polyester resin (C) and 4 parts by mass of electroconductive carbon powder (Ketjenblack EC) were put in a 75-L kneader, and kneaded at 160° C. for 4 minutes. Thereafter, 1 part by mass of montanic acid ester wax (Licowax E) was additionally put therein, and further kneaded at 160° C. for 1 minute. Then, 60 parts by mass of scaly mica (CS-060DC) was additionally put therein, and kneaded at 160° C. for 13 minutes, thereby obtaining a vibration damping material. The volume resistivity of the obtained vibration damping material was $3.1 \times 10^{+7} \Omega \cdot cm$. The average particle diameter, median particle diameter, and loss factor of the mica in the vibration damping material are shown in Table 2.

Example 15

36 parts by mass of the polyester resin (A), 4 parts by mass of electroconductive carbon powder (Ketjenblack EC), and 60 parts by mass of scaly mica (trade name: A-41, manufactured by Yamaguchi Mica Co., Ltd., average particle diameter of starting mica: 47 μm, median particle diameter of starting mica: 52 μm) are collectively put in a 60-cm³ kneader, and kneaded at 200° C. for 15 minutes, thereby obtaining a vibration damping material. The volume resistivity of the obtained vibration damping material was $2.7 \times 10^{+6} \Omega \cdot cm$. The average particle diameter, median particle diameter, and loss factor of the mica in the vibration damping material are shown in Table 2.

Example 16

36 parts by mass of the polyester resin (A), 4 parts by mass of electroconductive carbon powder (Ketjenblack EC), 30 parts by mass of scaly mica (A-41), and 60 parts by mass of scaly mica (B-82) were collectively put in a 60 cm³ kneader, and kneaded at 200° C. for 15 minutes, thereby obtaining a vibration damping material. The volume resistivity of the obtained vibration damping material was $2.1 \times 10^{+6} \Omega \cdot cm$. The average particle diameter, median particle diameter, and loss factor of the mica in the vibration damping material are shown in Table 2.

Example 17

36 parts by mass of the polyester resin (A), 4 parts by mass of electroconductive carbon powder (Ketjenblack EC), 30 parts by mass of scaly mica (trade name: A-21, manufactured by Yamaguchi Mica Co., Ltd., average particle diameter of starting mica: 20 μm, median particle diameter of starting mica: 25 μm), and 30 parts by mass of scaly mica (B-82) were collectively put in a 60-cm³ kneader, and kneaded at 200° C. for 15 minutes, thereby obtaining a vibration damping material. The volume resistivity of the obtained vibration damping material was $2.0 \times 10^{+6} \Omega \cdot cm$. The average particle diameter, median particle diameter, and loss factor of the mica in the vibration damping material are shown in Table 2.

Comparative Example 1

36 parts by mass of the polyester resin (A), 4 parts by mass of electroconductive carbon powder (Ketjenblack EC), and 60 parts by mass of scaly mica (A-21) were collectively put in a 60-cm³ kneader, and kneaded at 200° C. for 15 minutes, thereby obtaining a vibration damping material. The volume resistivity of the obtained vibration damping material was $4.5 \times 10^{+6} \Omega \cdot cm$. The average particle diameter, median particle diameter, and loss factor of the mica in the vibration damping material are shown in Table 2.

Comparative Example 2

36 parts by mass of a polyester resin (D) which was obtained by following the procedure of Example 1 except using a terephthalic acid (manufactured by Mizushima Aroma Co., Ltd.) as a starting material of dicarboxylic acid constitutional units and ethyleneglycol (fiber grade, manufactured by Nisso Maruzen Chemical Co., Ltd.) as a starting material of diol constitutional units, 4 parts by mass of electroconductive carbon powder (Ketjenblack EC), and 60 parts by mass of scaly mica (B-82) were collectively put in a 60 cm$^3$ kneader, and kneaded at 250° C. for 15 minutes, thereby obtaining a vibration damping material. The constitutional unit ratios, the intrinsic viscosity [η] and the calorie of crystallization exotherm peak (ΔHc) of the o polyester resin (D) are shown below.

$(A_1+B_1)/(A_0+B_0)=0$
$(A_1/A_0)=0$
$(A_2/A_0)=0$
$(A_3/A_0)=0$
$(B_2/B_0)=0$
$(B_3/B_0)=0$
[η]=0.85 (dL/g)
ΔHc=38 (J/g).

The volume resistivity of the obtained vibration damping material was $6.7\times10^{+6}$ Ω·cm. The average particle diameter, median particle diameter, and loss factor of the mica in the vibration damping material are shown in Table 2.

Comparative Example 3

36 parts by mass of a polyester resin PETG (trade name: EASTER6763, manufactured by Eastman Chemical Co., Ltd.) including terephthalic acid as a starting material of dicarboxylic acid constitutional units and an ethyleneglycol/1,4-cyclohexane-dimethanol mixture as a starting material of diol constitutional units, 4 parts by mass of electroconductive carbon powder (Ketjenblack EC), and 60 parts by mass of scaly mica (B-82) were collectively put in a 60 cm$^3$ kneader, and kneaded at 250° C. for 15 minutes, thereby obtaining a vibration damping material. The constitutional unit ratios, the intrinsic viscosity [η] and the calorie of crystallization exotherm peak (ΔHc) of the polyester resin PETG are shown below.

$(A_1+B_1)/(A_0+B_0)=0$
$(A_1/A_0)=0$
$(A_2/A_0)=0$
$(A_3/A_0)=0$
$(B_2/B_0)=0$
$(B_3/B_0)=0$
[η]=0.75 (dL/g)
ΔHc=0 (J/g).

The volume resistivity of the obtained vibration damping material was $6.5\times10^{+6}$ Ω·cm. The average particle diameter, median particle diameter, and loss factor of the mica in the vibration damping material are shown in Table 2.

Comparative Example 4

36 parts by mass of a polyester resin (E) which was obtained by following the procedure of Example 1 except using a terephthalic acid (manufactured by Mizushima Aroma Co., Ltd.)/sebacic acid (manufactured by HOKOKU CORPORATION) mixture as a starting material of dicarboxylic acid constitutional units and ethyleneglycol (fiber grade, manufactured by Nisso Maruzen Chemical Co., Ltd) as a starting material of diol constitutional units, 4 parts by mass of electroconductive carbon powder (Ketjenblack EC), and 60 parts by mass of scaly mica (B-82) were collectively put in a 60-cm$^3$ kneader, and kneaded at 150° C. for 15 minutes, thereby obtaining a vibration damping material. The constitutional unit ratios, the intrinsic viscosity [η] and the calorie of crystallization exotherm peak (ΔHc) of the polyester resin (E) are shown below.

$(A_1+B_1)/(A_0+B_0)=0$
$(A_1/A_0)=0$
$(A_2/A_0)=0$
$(A_3/A_0)=0$
$(B_2/B_0)=0$
$(B_3/B_0)=0$
[η]=0.35 (dL/g)
ΔHc=0 (J/g).

The volume resistivity of the obtained vibration damping material was $5.1\times10^{+7}$ Ω·cm. The average particle diameter, median particle diameter, and loss factor of the mica in the vibration damping material are shown in Table 2.

TABLE 1

|  | Example 1 | Example 2 | Example 3 | Example 4 | Example 5 | Example 6 |
|---|---|---|---|---|---|---|
| Polyester resin | A | A | A | A | B | C |
| $(A_1+B_1)/(A_0+B_0)$ | 1.0 | 1.0 | 1.0 | 1.0 | 1.0 | 1.0 |
| $(A_1/A_0)$ | 1.0 | 1.0 | 1.0 | 1.0 | 1.0 | 1.0 |
| $(A_2/A_0)$ | 1.0 | 1.0 | 1.0 | 1.0 | 1.0 | 1.0 |
| $(A_3/A_0)$ | 0.73 | 0.73 | 0.73 | 0.73 | 1.0 | 0.67 |
| $(B_2/B_0)$ | 1.0 | 1.0 | 1.0 | 1.0 | 1.0 | 1.0 |
| $(B_3/B_0)$ | 1.0 | 1.0 | 1.0 | 1.0 | 1.0 | 1.0 |
| [η] (dL/g) | 0.68 | 0.68 | 0.68 | 0.68 | 0.68 | 0.61 |
| ΔHc (J/g) | 0 | 0 | 0 | 0 | 0 | 0 |
| Composition of vibration damping material (part by mass) | | | | | | |
| Polyester resin | 36 | 36 | 36 | 36 | 36 | 36 |
| Mica (B-82) | 60 | 60 | 60 | 60 | 60 | 60 |
| Electroconductive carbon powder | 4 | 4 | 4 | 4 | 4 | 4 |
| Polyethylene wax | | | | | 6 | |
| Montanic acid ester wax | | | | | | |
| Kneading method | Collectively | Collectively | Collectively | Separately | Separately | Collectively |
| Temperature (° C.) | 130 | 150 | 200 | 200 | 200 | 200 |
| Time (minute) | 15 | 15 | 15 | 15/15 | 10/1/15 | 15 |

TABLE 1-continued

| Physical properties of vibration damping material | | | | | | |
|---|---|---|---|---|---|---|
| Average particle diameter of mica (μm) | 49 | 57 | 60 | 72 | 88 | 57 |
| Median particle diameter of mica (μm) | 31 | 44 | 44 | 52 | 70 | 43 |
| Volume resistivity (Ω·cm) | $3.8 \times 10^6$ | $1.1 \times 10^6$ | $4.1 \times 10^6$ | $7.0 \times 10^6$ | $5.0 \times 10^6$ | $3.1 \times 10^5$ |
| Loss factor | 0.24 | 0.25 | 0.26 | 0.26 | 0.25 | 0.24 |

| | Example 7 | Example 8 | Example 9 | Example 10 | Example 11 |
|---|---|---|---|---|---|
| Polyester resin | C | C | C | C | C |
| $(A_1 + B_1)/(A_0 + B_0)$ | 1.0 | 1.0 | 1.0 | 1.0 | 1.0 |
| $(A_1/A_0)$ | 1.0 | 1.0 | 1.0 | 1.0 | 1.0 |
| $(A_2/A_0)$ | 1.0 | 1.0 | 1.0 | 1.0 | 1.0 |
| $(A_3/A_0)$ | 0.67 | 0.67 | 0.67 | 0.67 | 0.67 |
| $(B_2/B_0)$ | 1.0 | 1.0 | 1.0 | 1.0 | 1.0 |
| $(B_3/B_0)$ | 1.0 | 1.0 | 1.0 | 1.0 | 1.0 |
| $[\eta]$ (dL/g) | 0.61 | 0.61 | 0.61 | 0.61 | 0.61 |
| $\Delta Hc$ (J/g) | 0 | 0 | 0 | 0 | 0 |
| Composition of vibration damping material (part by mass) | | | | | |
| Polyester resin | 36 | 36 | 36 | 36 | 36 |
| Mica (B-82) | 60 | 60 | 60 | 60 | 60 |
| Electroconductive carbon powder | 4 | 4 | 4 | 4 | 4 |
| Polyethylene wax | | | | | |
| Montanic acid ester wax | | 1 | 1 | 1 | 1 |
| Kneading method | Separately | Collectively | Collectively | Collectively | Separately |
| Temperature (° C.) | 200 | 120 | 150 | 200 | 160 |
| Time (minute) | 10/15 | 15 | 15 | 15 | 5/5/13 |
| Physical properties of vibration damping material | | | | | |
| Average particle diameter of mica (μm) | 101 | 74 | 77 | 76 | 101 |
| Median particle diameter of mica (μm) | 80 | 54 | 57 | 59 | 78 |
| Volume resistivity (Ω·cm) | $2.1 \times 10^6$ | $1.7 \times 10^7$ | $6.7 \times 10^6$ | $3.7 \times 10^7$ | $1.2 \times 10^7$ |
| Loss factor | 0.27 | 0.25 | 0.24 | 0.25 | 0.26 |

TABLE 2

| | Example 12 | Example 13 | Example 14 | Example 15 | Example 16 | Example 17 | Comparative Example 1 | Comparative Example 2 | Comparative Example 3 | Comparative Example 4 |
|---|---|---|---|---|---|---|---|---|---|---|
| Polyester resin | C | C | C | A | A | A | A | D | PETG | E |
| $(A_1 + B_1)/(A_0 + B_0)$ | 1.0 | 1.0 | 1.0 | 1.0 | 1.0 | 1.0 | 1.0 | 0 | 0 | 0 |
| $(A_1/A_0)$ | 1.0 | 1.0 | 1.0 | 1.0 | 1.0 | 1.0 | 1.0 | 0 | 0 | 0 |
| $(A_2/A_0)$ | 1.0 | 1.0 | 1.0 | 1.0 | 1.0 | 1.0 | 1.0 | 0 | 0 | 0 |
| $(A_3/A_0)$ | 0.67 | 0.67 | 0.67 | 0.73 | 0.73 | 0.73 | 0.73 | 0 | 0 | 0 |
| $(B_2/B_0)$ | 1.0 | 1.0 | 1.0 | 1.0 | 1.0 | 1.0 | 1.0 | 0 | 0 | 0 |
| $(B_3/B_0)$ | 1.0 | 1.0 | 1.0 | 1.0 | 1.0 | 1.0 | 1.0 | 0 | 0 | 0 |
| $[\eta]$ (dL/g) | 0.61 | 0.61 | 0.61 | 0.68 | 0.68 | 0.68 | 0.68 | 0.85 | 0.75 | 0.35 |
| $\Delta Hc$ (J/g) | 0 | 0 | 0 | 0 | 0 | 0 | 0 | 38 | 0 | 0 |
| Composition of vibration damping material (part by mass) | | | | | | | | | | |
| Polyester resin | 36 | 36 | 36 | 36 | 36 | 36 | 36 | 36 | 36 | 36 |
| Mica (B-82) | 60 | | | | 30 | 30 | | 60 | 60 | 60 |

TABLE 2-continued

|  | Example 12 | Example 13 | Example 14 | Example 15 | Example 16 | Example 17 | Comparative Example 1 | Comparative Example 2 | Comparative Example 3 | Comparative Example 4 |
|---|---|---|---|---|---|---|---|---|---|---|
| Mica (CS-060C) |  | 60 | 60 |  |  |  |  |  |  |  |
| Mica (A-41) |  |  |  | 60 | 30 |  |  |  |  |  |
| Mica (A-21) |  |  |  |  |  | 30 | 60 |  |  |  |
| Electroconductive carbon powder | 4 | 4 | 4 | 4 | 4 | 4 | 4 | 4 | 4 | 4 |
| Polyethylene wax |  |  |  |  |  |  |  |  |  |  |
| Montanic acid ester wax | 1 | 1 | 1 |  |  |  |  |  |  |  |
| Kneading method | Separately | Separately | Separately | Collectively | Collectively | Collectively | Collectively | Collectively | Collectively | Collectively |
| Temperature (° C.) | 160 | 200 | 160 | 200 | 200 | 200 | 200 | 250 | 250 | 150 |
| Time (minute) | 4/5/13 | 5/5/13 | 4/1/13 | 15 | 15 | 15 | 15 | 15 | 15 | 15 |
| Physical properties of vibration damping material |  |  |  |  |  |  |  |  |  |  |
| Average particle diameter of mica (μm) | 98 | 98 | 111 | 31 | 40 | 40 | 16 | 48 | 49 | 48 |
| Median particle diameter of mica (μm) | 78 | 84 | 97 | 27 | 30 | 24 | 13 | 32 | 37 | 34 |
| Volume resistivity (Ω · cm) | $3.1 \times 10^7$ | $1.8 \times 10^7$ | $3.1 \times 10^7$ | $2.7 \times 10^6$ | $2.1 \times 10^6$ | $2.0 \times 10^6$ | $4.5 \times 10^6$ | $6.7 \times 10^6$ | $6.5 \times 10^6$ | $5.1 \times 10^6$ |
| Loss factor | 0.27 | 0.26 | 0.28 | 0.24 | 0.25 | 0.21 | 0.19 | 0.02 | 0.05 | 0.13 |

As shown in Tables 1 and 2, the vibration damping materials of Examples 1 to 17 in which the average particle diameter of mica is larger than that of Comparative Example 1 have high loss factors and shows an excellent vibration damping ability. Even when the average particle diameter of mica is of the same degree, the vibration damping materials according to Examples of the present invention have high loss factors and show an excellent vibration damping ability as compared with Comparative Examples 2 to 4 in which the ratio $[(A_1+B_1)/(A_0+B_0)]$ is smaller than 0.5. Among the above Examples, in which substances were separately kneaded and montanic acid ester wax was used, and the average particle diameter and the median particle diameter of mica are large, show high loss factors, particularly.

INDUSTRIAL APPLICABILITY

According to the vibration damping material and the method of producing the same of the present invention, in a vibration damping material in which mica is dispersed in a polyester resin including dicarboxylic acid constitutional units and diol constitutional units distribute, by specifying the polyester resin and the average particle diameter of the mica which has been actually incorporated in the vibration damping material, a material which is lightweight and has an excellent vibration damping ability is obtained and such a vibration damping material can be readily produced with a batch mixer.

The vibration damping material of the present invention can be molded by known methods such as injection molding, extrusion, and press molding, and can be formed into or processed into an injection-molded product, a sheet, a film, a fiber, a container, a foam, an adhesive, a coating composition, a constrained vibration damping sheet, a non-constrained vibration damping sheet, etc. Moreover, the vibration damping material of the present invention can be suitably used as a versatile vibration damping material which can be applied to electrical and electronic equipment such as personal computers, OA equipment, AV equipment, and cellular phones; building machines, optical instruments, precision apparatuses, toys, shoes, sporting goods, home and office electrical appliances, motor vehicles, railroads, automobiles, aircrafts, marine vessels, and civil-engineering and construction products.

The invention claimed is:

1. A vibration damping material comprising: a polyester resin containing dicarboxylic acid constitutional units and diol constitutional units; and mica being dispersed in the polyester resin, wherein:
  (1) a ratio $[(A_1+B_1)/(A_0+B_0)]$ of a total of $(A_1)$ a number of the dicarboxylic acid constitutional units having an odd number of carbon atoms in a polyester main chain and $(B_1)$ a number of the diol constitutional units having an odd number of carbon atoms in the polyester main chain with respect to a total of $(A_0)$ a number of total dicarboxylic acid constitutional units and $(B_0)$ a number of total diol constitutional units in the polyester resin is in the range of 0.5 to 1; and
  (2) an average particle diameter calculated from a volume-based particle diameter frequency distribution of the mica in the vibration damping material is 25 to 500 μm.

2. The vibration damping material according to claim 1, wherein:
  a ratio $(A_1/A_0)$ of $(A_1)$ the number of the dicarboxylic acid constitutional units having an odd number of carbon atoms in the polyester main chain with respect to $(A_0)$ the number of total dicarboxylic acid constitutional units is in the range of 0.5 to 1; and
  a ratio $(B_2/B_0)$ of $(B_2)$ a number of constitutional units derived from diol represented by the general formula (I) with respect to $(B_0)$ the number of total diol constitutional units is in the range of 0.5 to 1:

[general formula (1)]

where R represents a hydrogen atom or a $C_{1-3}$ alkyl group and R's may be the same or different, and n is 3 or 5.

3. The vibration damping material according to claim 1, wherein the polyester resin has:
   (A) an intrinsic viscosity when measured at 25° C. in a 40/60 by mass trichloroethane/phenol mixed solvent is 0.2 to 2.0 dL/g; and
   (B) a heat value of crystallization exotherm peak under temperature drop conditions measured using a differential scanning calorimeter is 5 J/g or less.

4. The vibration damping material according to claim 2, wherein a ratio ($B_2/B_0$) of ($B_2$) the number of constitutional units derived from the diol represented by the general formula (I) with respect to ($B_0$) the number of total diol constitutional units of the polyester resin is in the range of 0.7 to 1.

5. The vibration damping material according to claim 2, wherein a ratio ($A_2/A_0$) of ($A_2$) a number of constitutional units derived from dicarboxylic acid selected from the group consisting of isophthalic acid, malonic acid, glutaric acid, pimelic acid, azelaic acid, undecanedioic acid, brassylic acid, and 1,3-cyclohexanedicarboxylic acid with respect to ($A_0$) the number of total dicarboxylic acid constitutional units in the polyester resin is in the range of 0.5 to 1.

6. The vibration damping material according to claim 5, wherein the ratio ($A_2/A_0$) is in the range of 0.7 to 1.

7. The vibration damping material according to claim 5, wherein a ratio ($A_3/A_0$) of ($A_3$) the number of constitutional units derived from the isophthalic acid with respect to ($A_0$) the number of total dicarboxylic acid constitutional units of the polyester resin is in the range of 0.5 to 1.

8. The vibration damping material according to claim 2, wherein a ratio ($B_3/B_0$) of ($B_3$) a number of constitutional units derived from diol selected from the group consisting of 1,3-propanediol, 1,5-pentanediol, 2-methyl-1,3-propanediol, 1,3-butanediol, and neopentyl glycol with respect to ($B_0$) the number of total diol constitutional units in the polyester resin is in the range of 0.5 to 1.

9. The vibration damping material according to claim 8, wherein the ratio ($B_3/B_0$) is in the range of 0.7 to 1.

10. The damping material according to claim 1, wherein the diol constitutional units having an odd number of carbon atoms in the main chain are units derived from at least one diol selected from the group consisting of 1,3-propanediol, 1,5-pentanediol, 2-methyl-1,3-propanediol, 1,3-butanediol and neopentyl glycol.

11. The vibration damping material according to claim 1, wherein the dicarboxylic acid constitutional unit having an odd number of carbon atoms in the main chain is a constitutional unit derived from a combination of isophthalic acid and azelaic acid.

12. The vibration damping material according to claim 1, wherein the dicarboxylic acid constitutional unit having an odd number of carbon atoms in the main chain is a constitutional unit derived from isophthalic acid.

13. The vibration damping material according to claim 1, wherein a median particle diameter measured from a volume-based particle diameter frequency distribution of the mica in the vibration damping material is 25 to 500 μm.

14. The vibration damping material according to claim 13, wherein an average particle diameter measured from a volume-based particle diameter frequency distribution of the mica in the vibration damping material is 60 to 300 μm.

15. The vibration damping material according to claim 14, wherein a median particle diameter measured from a volume-based particle diameter frequency distribution of the mica in the vibration damping material is 60 to 300 μm.

16. The vibration damping material according to claim 1, further comprising an electroconductive material.

17. The vibration damping material according to claim 16, wherein the electroconductive material is a carbonaceous material.

18. The vibration damping material according to claim 16, wherein the electroconductive material is an electroconductive carbon powder.

19. The vibration damping material according to claim 16, wherein a content of the electroconductive material is 0.01 to 25% by mass with respect to the vibration damping material.

20. The vibration damping material according to claim 16, wherein the composition has a volume resistivity of $1.0 \times 10^{+12}$ Ω·cm or lower.

21. The vibration damping material according to claim 1, wherein a content of the mica is 10 to 80% by mass with respect to the vibration damping material.

22. A vibration damper comprising a molded vibration damping material according to claim 1.

23. A method of producing the vibration damping material according to claim 16, comprising mixing mica with said polyester resin in a batch mixer.

24. The method of producing a vibration damping material according to claim 23, comprising adding a wax when mixing mica.

25. The method of producing a vibration damping material according to claim 24, wherein the wax comprises a montanic acid ester wax.

26. The method of producing a vibration damping material according to claim 24, comprising:
   adding and mixing a wax after mixing the electroconductive material and the polyester resin; and
   adding and mixing mica.

27. A method of producing the vibration damping material according to claim 1, comprising mixing mica with said polyester resin in a batch mixer.

28. The method of producing a vibration damping material according to claim 27, comprising adding a wax when mixing mica.

29. The method of producing a vibration damping material according to claim 28, wherein the wax comprises a montanic acid ester wax.

30. A vibration damper comprising a molded vibration damping material according to claim 16.

* * * * *